Oct. 11, 1966 H. H. BLUMENBERG ET AL 3,278,886

ELECTRONIC DEVICE

Filed Sept. 25, 1964

Inventors:
Horst H. Blumenberg and
James H. Schwartz
By Mueller and Aichele
Attys 3,278,886
ELECTRONIC DEVICE
Horst H. Blumenberg, Schiller Park, and James W. Schwartz, Western Springs, Ill., assignors, by mesne assignments, to National Video Corporation, Chicago, Ill., a corporation of Illinois
Filed Sept. 25, 1964, Ser. No. 399,246
8 Claims. (Cl. 339—145)

This invention relates to an arc resistant tube base and tube socket and in particular to an arc-resistant tube base and tube socket as used with a color television picture tube.

It has been desirable to reduce the size of the picture tube used in color television sets so that the overall size of the receiver cabinet may be made smaller and more attractive to the consumer. To accomplish this a color-picture tube with a rectangular face has been developed which has a wide deflection angle (90°) and is therefore smaller in overall size than the previously used round (70°) picture tubes.

In increasing the deflection angle of the picture tube, the diameter of the neck of the tube, containing the gun structure, has been made smaller. This reduction in the size of the tube neck also reduces the spacing between the tube pins which are connected to the gun electrodes and particularly the spacing between the focusing anode pin and adjacent pins. Furthermore, in order to reduce the size of the picture tube, a wider deflection angle is used which requires greater focusing anode voltages. Thus, the spacing between the focusing anode pin and adjacent pins has been decreased while the voltage applied to the focusing anode pin has been increased. The voltage stress between the focusing anode pin and adjacent pins is sufficiently high that arcing between the pins will occur when a standard tube base and socket are used, particularly in conditions of high humidity.

It is, therefore, an object of this invention to provide a color television picture tube with an improved arc-resistant tube base and tube socket for the small diameter neck of such a tube.

Another object of this invention is to provide a color television picture tube with a tube base constructed to reduce the tendency for arcing between the focusing anode pin and adjacent pins.

Another object of this invention is to provide a color television picture tube with a tube socket constructed to reduce the tendency for arcing between the focusing anode and adjacent pins and leads.

A feature of this invention is the provision of a color television picture tube base having a recessed portion around the anode pin for receiving sealing material to seal to the tube envelope to the tube base.

Another feature of this invention is the provision of a color television picture tube with a base having an extended portion surrounding the focusing anode pin to form a nonconductive shielding wall.

Another feature of this invention is the provision of a television picture tube with a tube socket having an extended portion on the rearward face for shielding the focusing anode pin and lead thereto.

Another feature of this invention is the provision of a color television picture tube with a socket having a receptacle on the front portion thereof for receiving and mating with the extended portion of the picture tube base. The height of the extended portion and the length of the tube pins are proportioned so that shielding takes place as long as the pins are in electrical contact with the tube socket.

The invention is illustrated in the drawings wherein.

Figures 1, 2, 3, 4, 5, 6, 7:
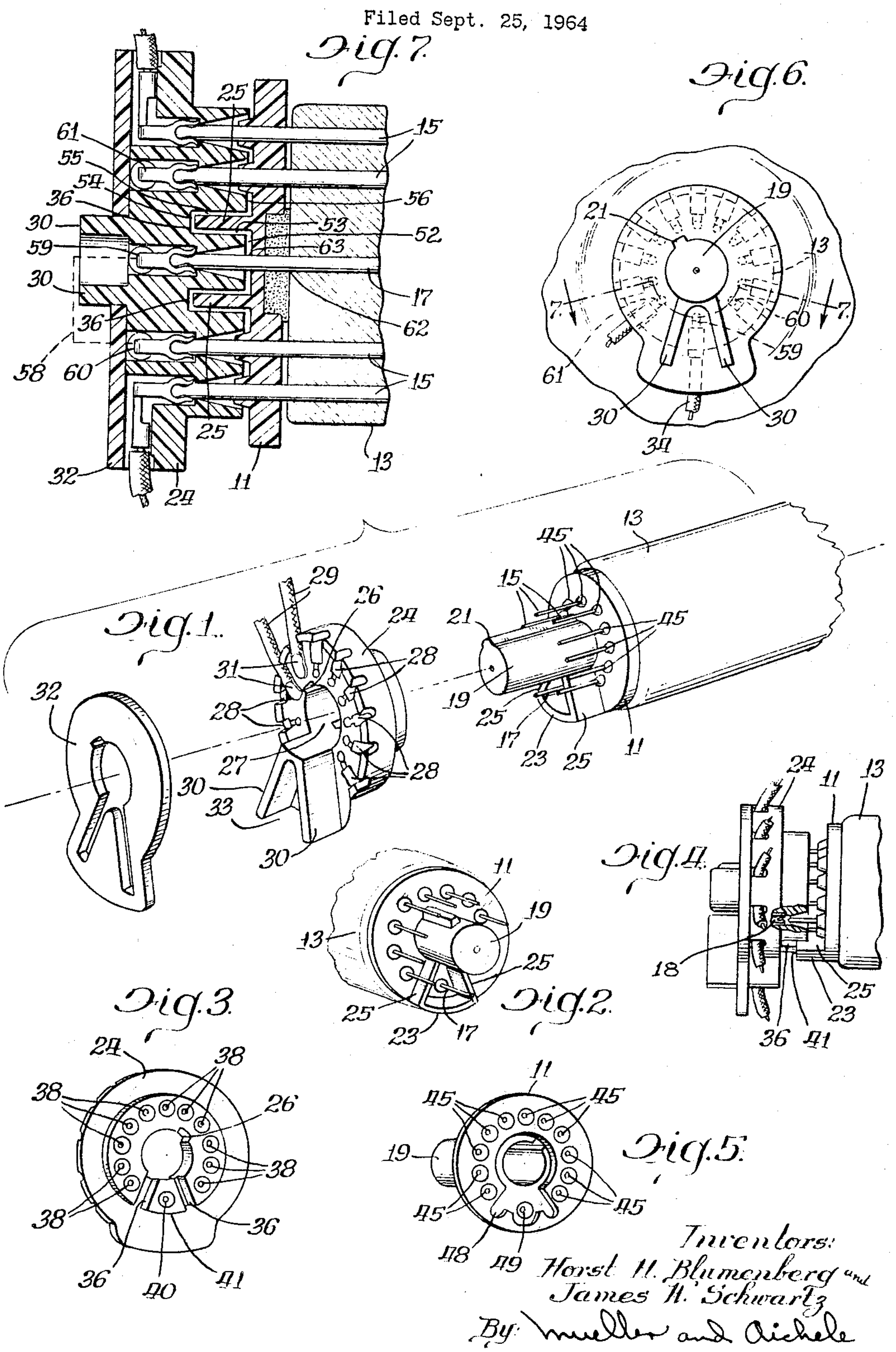
FIG. 1 is an exploded perspective view of the tube base and tube socket.
FIG. 2 is a perspective view of the rear face of the tube base.
FIG. 3 is a perspective view of the front face of the tube socket.
FIG. 4 is an elevational view showing the mating of the wall and slot portion of the tube base and tube socket.
FIG. 5 is a perspective view of the front face of the tube base.
FIG. 6 is a back view of the tube socket and base assembly.
FIG. 7 is a cross-section of the tube base and socket assembly taken along the line 7—7 of FIG. 6.

In practicing this invention a color television picture tube is provided with a base and tube socket constructed to shield the focus anode pin from adjacent pins to prevent arcing between them. The tube base has a central keyed pin extending from the rear face to insure proper insertion of the tube socket into the tube base. The base portion surrounding the anode pin is extended rearward for a distance sufficient to provide shielding for the focusing anode pin. In addition, a portion of the face of the tube base adjacent the tube neck structure and surrounding the anode pin is recessed. This recessed portion is filled with a sealing material to effectively seal the base of the picture tube surrounding the anode pin to the tube base. This seal prevents arcing between the anode pin and adjacent pins at the point where the pins leave the glass envelope.

The tube base is inserted in a tube socket having portions cut away to receive the rearwardly extended portion surrounding the anode pin. The rearward face of the tube socket also has an extended portion surrounding the anode pin lead and anode pin receptacle to prevent arcing between this point and the adjacent pin leads.

FIG. 1 is an exploded view of the tube base and the tube socket which may be made of an insulating material such as Glaskyd and which provides an arc resistant shield surrounding the focusing anode pin. FIG. 2 shows the rear face of the tube base. A tube base 11 having openings 45 therein is cemented to the base of neck 13 of a television picture tube. Pin 17 connected to the focusing anode and pins 15 connected to the other electrodes of the picture tube protrude through openings 45 in the tube base 11. A cylindrical locating pin 19 of tube base 11 having a key 21 extends rearwardly from the rear face of tube base 11. Pin 17 connected to the focusing anode of the picture tube is surrounded by a nonconductive shielding wall which includes side walls 25 outside wall 23 and a portion of locating pin 19.

A tube socket 24 is provided having openings 28 in the rear face with lead wires 29 and connectors 31 positioned therein. Connectors 31 receive tube pins 15 and 17 when tube base 11 is inserted in tube socket 24. Key 21 entering slot 26 positions socket 24 and tube base 11 so that the pins 15 and 17 enter the proper connectors. A V shaped nonconductive wall 30, partially surrounding the opening 28 for the focusing anode lead and extending rearwardly from the rear face of the tube socket 24, provides arcing protection for the focusing anode lead. Wall 30 is open along the outside periphery 33 to permit the focusing anode lead to be connected to tube socket 24. An insulating cover 32 covers the rear portion of the tube socket holding the leads 29 and connectors 31 in place.

FIG. 3 illustrates the forward face of tube socket 24. Tube socket 24 has an opening 40 for receiving focusing anode pin 17 and openings 38 for receiving electrode pins 15. Tube socket 24 also has slots 36 for receiving the side walls 25 of the shielding wall of tube base 11. Outside wall 23 is positioned along side 41 and together with side walls 25 and locating pin 19 surround opening 40 through which focusing anode pin 17 is inserted. FIG. 4 shows a tube base 11 partially inserted into tube socket 24. Side wall 25 enters slot 36 and outside wall 23 is positioned along side 41.

FIG. 5 illustrates the front face of tube base 11, which is positioned against and cemented to neck 13 of the picture tube. Openings 45 are provided for pin 15 from the tube electrodes to pass through the tube base. Opening 49 is the opening for focusing anode pin 17 and is spaced apart from pins 15 for the other electrodes. A recessed portion 48 surrounding opening 49 is formed in tube base 11 for holding sealing material.

FIG. 6 shows the assembly of tube base 11 and tube socket 24 as seen from the rear face of tube socket 24. A V shaped non-conductive wall 30 partially surrounds focusing anode connector 59 to prevent arcing between connector 59 and the adjacent connectors 60 and 61. With wall 30 incorporated in tube socket 11 the air paths between connectors 59 and 60 and 59 and 61 are lengthened to increase the resistance to arcing between the leads and connectors.

FIG. 7 is a cross-sectional view of tube base 11 and tube socket 24 cut away as shown in FIG. 6. There are three points in this assembly at which arcing can occur. The first is point 62 where focusing anode pin 17 leaves the tube envelope 13 and enters tube base 11. The second is at point 63 where pin 17 leaves tube base 11 and enters tube socket 24 and the third is between the connectors and the leads in tube socket 24. Recessed portion 48 of tube base 11 is filled with a sealing material which effectively seals tube base 11 to tube envelope 13 and surrounds focusing anode pin 17 to insulate pin 17 at this point. Since the dielectric strength of the sealing compound used is greater than that of air, the sealing compound prevents arcing at this point. An example of sealing compound which may be used for this purpose is RTV Silastic.

At the point where anode pin 17 leaves the tube base and enters tube socket 24 a non-conductive wall 25 is provided which, together with outside wall 23 and locating pin 19 shown in FIG. 1, surrounds anode pin 17. Wall 25 is inserted into slot 36 of tube socket 24. Wall 25 increases the length of the air path between focusing anode pin 17 and the adjacent pin 15, thus increasing the voltage required to cause arcing. Instead of flowing directly from pin 17 to pin 15 by the shortest distance, an arc would be required to follow the path shown by the numbers 52, 53, 54, 55 and 56. This provides a considerable increase in the air path length between pins 17 and 15 thus raising the voltage which can cause arcing to a value much higher than the voltages which are present on pin 17.

Side wall 25 and outside wall 23 are sufficiently high so that when socket 24 is removed from base 11, no direct air path between focusing anode pin 17 and adjacent pins 15 exists as long as focusing anode pin 17 is in electrical contact with receptacle 59. This is illustrated in FIG. 4 where pin 15 is shown removed from contact with receptacle 18 and walls 25 and 23 together with slot 36 cooperate to form an air path between the focusing anode pin and the adjacent pins which is long enough to prevent arcing. Thus the tube base and socket structure described also prevent arcing if the socket is removed from the base with the power supply to the tube energized.

A V-shaped non-conductive wall 30 is also provided around anode pin 17, separating connector 59 from the adjacent connectors 60 and 61. Wall 30 increases the air path length between the adjacent connectors to the path indicated by dashed line 58. This path length is sufficient to prevent arcing between the focusing anode lead and connector and adjacent leads and connectors.

Thus, a simple means is provided to prevent arcing between closely spaced pins of a television picture tube by increasing the air path length between the adjacent pins and by surrounding pins having a high voltage thereon with an insulating material having a higher dielectric strength than air. This is accomplished without increasing the overall diameter of the picture tube neck.

We claim:

1. A vacuum tube base structure for preventing arcing between a high voltage pin and adjacent pins, said base structure having a plurality of openings therein for receiving the vacuum tube pins including the high voltage pin, and a non-conductive shielding wall extending rearwardly from the rear face of the tube base and surrounding the high voltage pin to prevent arcing therefrom to adjacent pins.

2. A vacuum tube base structure for preventing arcing between a high voltage pin and adjacent pins, the base structure having a plurality of openings therein for receiving the vacuum tube pins including the high voltage pin and a centrally positioned tube locating projection extending rearwardly from the rear face of the tube base, the tube base including in combination, a non-conductive shielding wall extending rearwardly from the rear face of the tube base, the locating projection and said shielding wall cooperating to surround the high voltage pin to prevent arcing therefrom to adjacent pins.

3. A vacuum tube base structure for preventing arcing between a high voltage pin and adjacent pins, the base structure having a forward face positioned against the vacuum tube, the base having a plurality of openings therein for receiving the vacuum tube pins, including in combination, a recessed portion in the forward face surrounding the opening for the high voltage pin, sealing material substantially filling said recessed portion and surrounding the high voltage pin, said sealing material acting to join the tube base to the tube whereby arcing between the high voltage pin and the tube base is prevented, a non-conductive shielding wall extending rearwardly from the rear face of the tube base and surrounding the high voltage pin whereby the air path length between the high voltage pin and the adjacent pins is lengthened to prevent arcing therebetween.

4. A vacuum tube base structure for preventing arcing between a high voltage pin and adjacent pins, the base structure having a forward face positioned against the tube, the base having a plurality of openings therein for receiving the tube pins and a centrally positioned tube locating projection extending rearwardly from the rear face of the tube base, the tube base including in combination, a recessed portion in the forward face surrounding the opening for the high voltage pin, sealing material substantially filling said recessed portion and surrounding the high voltage pin, said sealing material acting to join the tube base to the tube whereby arcing between the high voltage pin and the adjacent pins is prevented, a non-conductive shielding wall extending rearwardly from the rear face of the tube base, the locating projection and said shielding wall cooperating to surround the high voltage pin to prevent arcing therefrom to adjacent pins.

5. A vacuum tube base and socket structure for preventing arcing between a high voltage pin and adjacent pins, said base structure having a plurality of openings therein for receiving the vacuum tube pins including the high voltage pin, a first non-conductive shielding wall extending rearwardly from the rear face of the tube base and surrounding the high voltage pin, said tube socket having a plurality of openings for receiving the tube pins including the high voltage pin, said tube socket further including slots on the forward face thereof on opposite sides of the high voltage pin for receiving said first shielding wall and a V shaped second non-conductive shielding wall positioned on the rear face of the tube socket between the high voltage pin and adjacent pins, said first and second shielding walls acting to prevent arcing from the high voltage pin to adjacent pins.

6. A vacuum tube base and socket structure for preventing arcing between a high voltage pin and adjacent pins, said socket being adapted to be removed from said base, said base structure having a plurality of openings therein for receiving the vacuum tube pins including the high voltage pin, a non-conductive shielding wall extending rearwardly from the rear face of the tube base and surrounding the high voltage pin, said tube socket having a plurality of openings, an electrical receptacle positioned in each of said plurality of tube socket openings for receiving the tube pins including the high voltage pin, said tube socket further including slots on the forward face thereof on opposite sides of the high voltage pin for receiving said shielding wall, the height of said shielding wall and the length of said pins being proportioned so that the air path between said high voltage pin and said adjacent pin is sufficiently long to prevent arcing from said high voltage pin to said adjacent pins during removal of said tube socket from said tube base.

7. A vacuum tube base and socket structure for preventing arcing between a high voltage pin and adjacent pins, the base having a plurality of openings therein for receiving the tube pins and a forward face positioned against the tube, the socket having a plurality of openings and a plurality of connectors and leads conected thereto positioned in the openings for receiving the tube pins, including in combination, a recessed portion in the forward face of the tube base surrounding the opening for the high voltage pin, sealing material substantially filling said recessed portion and surrounding the high voltage pin, said sealing material acting to join the tube base to the tube whereby arcing between the high voltage pin and the tube base is prevented, a first non-conductive shielding wall extending rearwardly from the rear face of the tube base and surrounding the high voltage pin, the tube socket including slots on the forward face thereof positioned on opposite sides of the high voltage pin for receiving said first shielding wall, a V shaped second non-conductive shielding wall positioned on the rear face of the tube socket between the high voltage pin and adjacent pins, said second wall being open on the side along the outside periphery of the tube socket to provide an opening for the lead to the high voltage pin, said first and second shielding walls acting to increase the air path length between the high voltage pin and adjacent pins to prevent arcing therebetween.

8. A vacuum tube base structure for preventing arcing between a high voltage pin and adjacent pins, the base having a plurality of openings therein for receiving the tube pins and a forward face positioned against the tube, including in combination, a recessed portion in the forward face of the tube base surrounding the opening for the high voltage pin, a non-conductive sealing material substantially filling said recessed portion and surrounding the high voltage pin, said sealing material acting to join the tube base to the tube whereby arcing between the high voltage pin and the tube base is prevented.

References Cited by the Examiner

UNITED STATES PATENTS

| | | | |
|---|---|---|---|
| 2,205,502 | 6/1940 | Tromp | 339—145 |
| 2,556,956 | 6/1951 | Benton et al. | 339—193 |
| 2,563,775 | 8/1951 | Del Camp | 339—193 |
| 2,677,116 | 4/1954 | Ritter | 339—193 X |
| 2,915,734 | 12/1959 | Alden | 339—143 |

References Cited by the Applicant

UNITED STATES PATENTS

| | | |
|---|---|---|
| 1,536,855 | 5/1925 | Housekeeper. |
| 2,263,396 | 11/1941 | Power. |
| 2,277,121 | 3/1942 | Lopp. |
| 2,291,660 | 8/1942 | Spencer. |
| 2,314,060 | 3/1943 | Victoreen. |
| 2,348,216 | 5/1944 | Holshouser. |
| 2,458,652 | 1/1949 | Sears. |
| 2,470,518 | 5/1949 | Orr. |
| 2,667,528 | 1/1954 | Sokolov. |
| 2,831,279 | 4/1958 | Warsher. |

EDWARD C. ALLEN, *Primary Examiner.*

W. D. MILLER, *Assistant Examiner.*